C. P. BERMES.
PLOW AND CHOPPER.
APPLICATION FILED APR. 4, 1911. RENEWED APR. 22, 1912.
1,030,156.
Patented June 18, 1912.
2 SHEETS—SHEET 1.
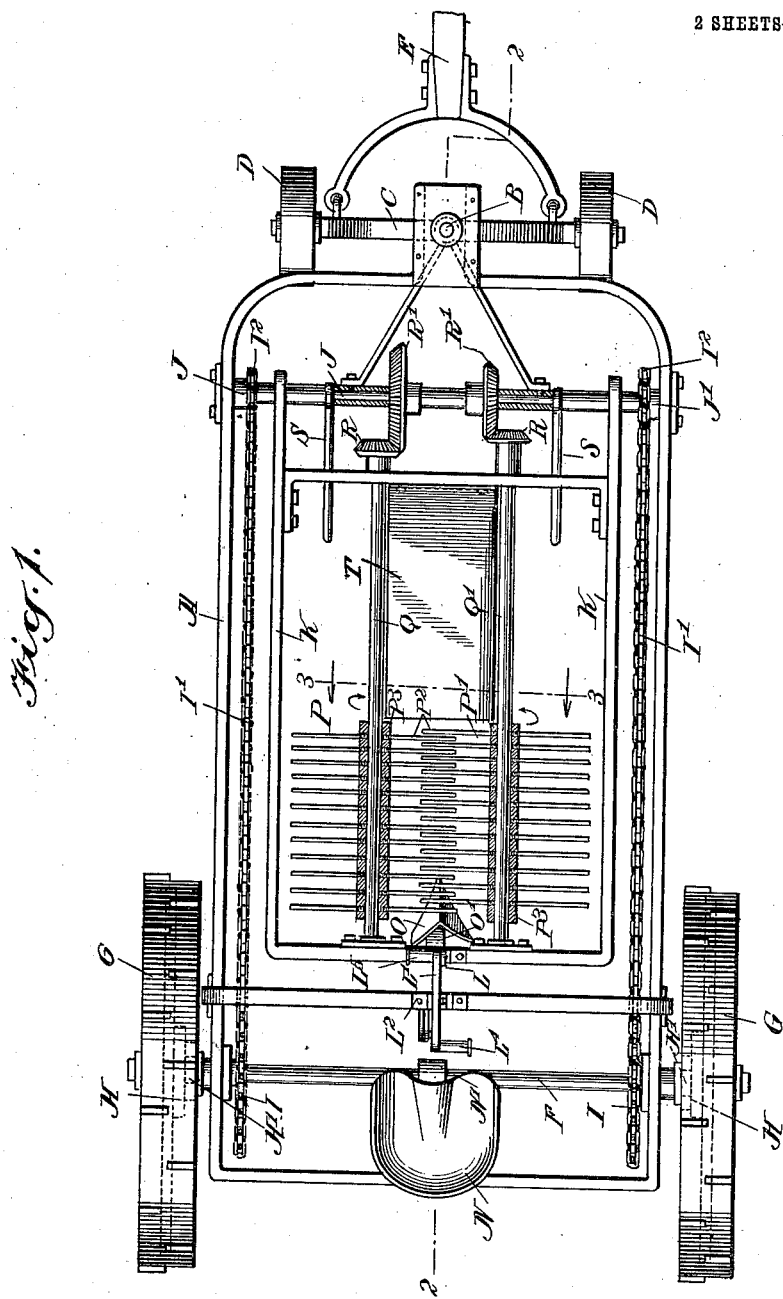
WITNESSES
INVENTOR
Charles P. Bermes.
BY
ATTORNEYS

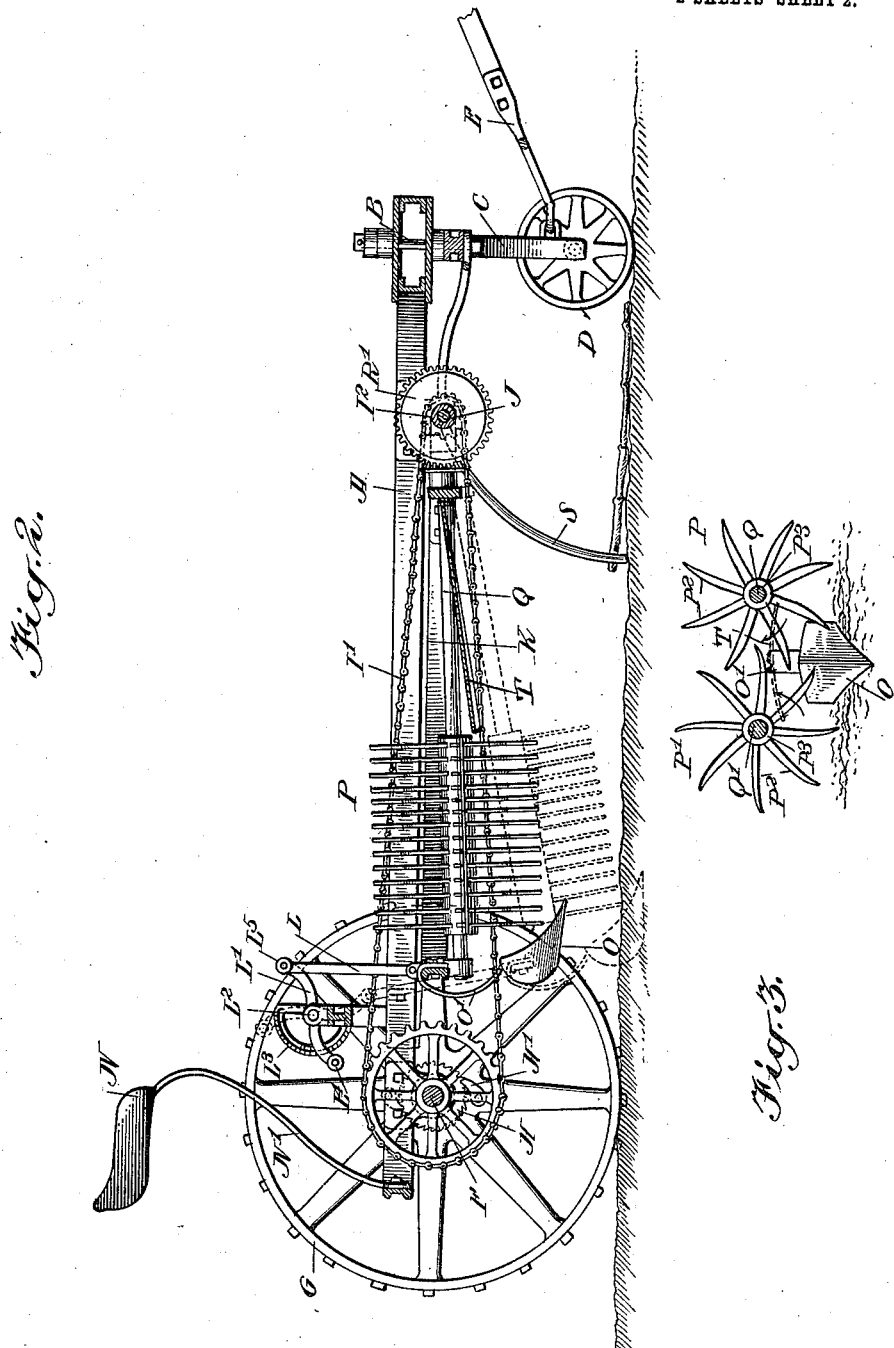

UNITED STATES PATENT OFFICE.

CHARLES PHILIP BERMES, OF CARROLLTON, ILLINOIS.

PLOW AND CHOPPER.

1,030,156.      Specification of Letters Patent.     Patented June 18, 1912.

Application filed April 4, 1911, Serial No. 618,802. Renewed April 22, 1912. Serial No. 692,543.

*To all whom it may concern:*

Be it known that I, CHARLES P. BERMES, a citizen of the United States, and a resident of Carrollton, in the county of Greene and State of Illinois, have invented a new and Improved Plow and Chopper, of which the following is a full, clear, and exact description.

The object of the invention is to provide a new and improved plow and chopper, more especially designed for plowing up corn stubs and chopping the same with the stalks into small pieces or fragments, and scattering the same over the ground to be subsequently plowed in for fertilizing purposes.

For the purpose mentioned use is made of a pair of revoluble cutters having their axes extending lengthwise and parallel to each other, and between the said cutters pass the stubs and stalks plowed up from the ground and raised between the said cutters by a plow located immediately below the cutters at the rear ends thereof.

A practical embodiment of the invention is represented in the accompanying drawings forming a part of this specification, in which similar characters of reference indicate corresponding parts in all the views.

Figure 1 is a plan view of the plow and chopper, parts being in section; Fig. 2 is a side elevation of the same on the line 2—2 of Fig. 1; and Fig. 3 is a cross section of the same showing more particularly the pair of cutters and plow, the section being on the line 3—3 of Fig. 1.

The main frame A of the machine is provided at its front end with a king bolt B engaging an arched front or steering axle C carrying front or steering wheels D and connected with a tongue E for the draft animals employed for drawing the machine over the ground. On the rear of the main frame A is journaled a rear shaft or axle F, on which are mounted to turn loosely the rear or traction wheels G connected by ratchet wheels H and pawls H' with the said axle F, so that when the machine is drawn forward the traction wheels G rotate the axle F, and the traction wheels G are free to turn independently of the axle F when turning the machine around or backing the machine up.

On the shaft F are secured sprocket wheels I connected by sprocket chains I' with sprocket wheels I² secured on a shaft J journaled in suitable bearings J' attached to the main frame A near the front end thereof, as plainly indicated in the drawings. On the shaft J is hung loosely the front end of a sub-frame K pivotally connected at its rear ends by a link L with a foot lever L' fulcrumed on a bracket L² attached to the main frame A, the said foot lever L' being under the control of the operator seated in a seat N mounted on a spring arm N' attached to the rear end of the main frame. The foot lever L' is adapted to be locked in position on a notched segment L³ so as to hold the said foot lever in the desired position. The foot lever L' is provided on opposite sides of its fulcrum with treads L⁴, L⁵ adapted to be engaged by the operator's foot, to impart a swinging motion to the foot lever L' in either direction so as to swing the sub-frame K downward or upward, and when the desired position is reached the foot lever L' is locked to the segment L³ so as to hold the sub-frame K in the adjusted position.

On the rear end of the sub-frame K is secured the plow beam O' of a plow O adapted to plow up the corn stubs and to lift the same with their stalks between a pair of revoluble cutters P, P' secured on longitudinally-extending shafts Q, Q' journaled in suitable bearings in the sub-frame K. The forward ends of the shafts Q, Q' are provided with bevel pinions R in mesh with bevel gear wheels R' secured on the shaft J, so that when the machine is drawn over the ground and the main shaft F is rotated by the action of the traction wheels G a rotary motion is given to the shaft J by the sprocket wheels I, I² and the sprocket chains I', and the rotary motion of the shaft J is transmitted by the gear wheels R', R to the shafts Q, Q', to rotate the cutters P, P' in unison with each other and in the direction indicated by the arrows in Fig. 3. The cutters P and P' are each formed of sets of knives P², screwing with their inner threaded ends in hubs P³ fastened to the shafts Q, Q' by the said threaded ends, to serve as set screws. The knives of the cutters P and P' overlap each other, as plainly indicated in the drawings, and the plow O is located immediately below the overlapping portions of the knives, that is, at the middle of the cutters P, P', so that on plowing up the corn stubs and raising the same they are fed between the sets of knives which chop up the stubs and their stalks and scatter the cut pieces over the ground to be subsequently plowed in, if desired.

On the shaft J are hung loosely the downwardly and rearwardly extending arms S adapted to drag on the ground on opposite sides of the center line of the machine so as to straighten out the corn stalks with a view to insure their being lifted up between the cutters P and P' on the plow raising the ground, to insure cutting of the stalks as well as the stubs.

It is understood that normally the sub-frame K is in a lowermost position with the plow O in the ground to plow up the hills containing the corn stubs, the plow lifting the stubs sufficiently high up for the knives $P^2$ of the cutters P, P' to take hold of the stubs and their stalks and cut up the same as the machine is drawn along over the ground.

In practice, it is preferable to drive the revoluble cutters P and P' at different rates of speeds by arranging the gear wheels R and R' for the shafts Q and Q' correspondingly. In order to prevent the stalks in front of the cutters from being thrown up into the air by the front ends of said cutters P, P', use is made of a fender T secured at its forward end to the sub-frame K and extending rearwardly to within a short distance of the forward ends of the cutters P, P', below the axes thereof, as plainly indicated in the drawings.

Having thus described my invention, I claim as new and desire to secure by Letters Patent:—

1. A combined plow and chopper, comprising a pair of revoluble cutters between which the stalks and stubs are cut into small pieces, the said cutters having their axes extending lengthwise of the machine, and a plow immediately below the said cutters for plowing up the stubs and lifting the same and their stalks up and between the said revoluble cutters.

2. A combined plow and chopper, comprising a pair of revoluble cutters having their axes parallel and arranged lengthwise of the machine, and a plow immediately below and between said cutters and at the rear ends thereof to plow up the stubs and raise the same between the cutters.

3. A combined plow and chopper, comprising a pair of revoluble cutters having their axes parallel and arranged lengthwise of the machine, each cutter having a plurality of knives, the knives of the two cutters overlapping each other to cut the stalks and stubs between them, and a plow immediately below and between the cutters at the rear ends thereof to plow up the stubs and raise the latter and the stalks between the said cutters.

4. A combined plow and chopper, comprising a pair of revoluble cutters having their axes parallel and arranged lengthwise of the machine, a plow immediately below and between the said cutters at the rear ends thereof, and means for driving said revoluble cutters at different rates of speed with relation to each other.

5. A combined plow and chopper, comprising a pair of revoluble cutters having their axes parallel and arranged lengthwise of the machine, a frame in which the cutters are journaled, a plow carried by the frame and extending immediately below and between the cutters at the rear ends thereof, means for driving said cutters, and a fender secured at its forward end to said frame, the rear end of said fender extending adjacent to the forward ends of said cutters and below the axes thereof.

6. A combined plow and chopper, comprising a frame, a pair of revoluble cutters journaled in the frame and having their axes parallel and arranged lengthwise of the machine, the said cutters having a plurality of cutting knives, the knives of the two cutters overlapping each other to cut the stalks and stubs between them, a plow having its beam secured to said frame at the rear of the cutters, the said plow extending immediately below and between the cutters at the rear ends thereof to plow up the stubs and raise the latter and the stalks between the said cutters, and means carried by the frame at the front of said cutters for preventing the stalks from being thrown up into the air by the front ends of said cutters.

7. In a combined plow and chopper, a frame, a pair of revoluble cutters journaled in the frame and having their axes parallel and arranged lengthwise of the machine, means for driving said cutters, and a plow having its beam secured to the frame at the rear of the cutters, the said plow extending immediately below the cutters at the rear ends thereof.

In testimony whereof I have signed my name to this specification in the presence of two subscribing witnesses.

CHARLES PHILIP BERMES.

Witnesses:
THOMAS HENSHAW,
MARY H. ANDREWS.

Copies of this patent may be obtained for five cents each, by addressing the "Commissioner of Patents, Washington, D. C."